3,329,624
COMPOSITION FOR PRODUCING SMOKE
William Eric Ashton, Niagara Falls, N.Y., assignor to Hooker Chemical Corporation, Niagara Falls, N.Y., a corporation of New York
No Drawing. Filed Jan. 16, 1963, Ser. No. 251,764
5 Claims. (Cl. 252—305)

The present invention relates to pyrotechnic compositions and more particularly to smoke-generating compositions.

Chemicals in the category of screening smokes are those which, when dispersed in air, produce a cloud of finely divided particles of solid, liquid, or both. These are used to shield tactical operations or disrupt the movements of the enemy. Outstanding examples of such materials are: fuel oil used in "artificial fog" generators, white phosphorus, sulfur trioxide, titanium tetrachloride, and so called zinc chloride smokes. Each of the above-listed smoke-generating compositions is characterized by certain advantages and disadvantages in military operations, depending upon the importance of such factors as mobility of the smoke producing apparatus, toxicity, logistical considerations, and the total obscuring power of the composition employed.

For military use, volatile hygroscopic chloride (HC) smokes are the most important, other than oil mixtures, which are utilized for large scale operations. The most widely used HC types of smokes are those resulting in the production of zinc chloride smokes.

The original mixture employed to produce a zinc chloride smoke was the Berger mixture, developed by the French Army during World War I. The original Berger mixture consisting of zinc dust and carbon tetrachloride with zinc oxide and diatomite. Upon ignition, a vigorous reaction takes place, resulting in the formation of zinc chloride, which is volatilized by the heat of the reaction and solidifies to form smoke. However, since this mixture employed a liquid organic chloride, it was difficult to transport and store. By the beginning of World War II, the United States Government had developed a mixture designated "HC smoke mixture" which contained zinc, a perchlorate as an oxidizing agent, hexachloroethane as the organic chloride compound, with a retarder, ammonium chloride. Subsequently, a mixture was found which was better in many ways than the original; it was a combination of hexachloroethane, aluminum and zinc oxide. This mixture required no stabilizer against moisture absorption, and changing the percentage of aluminum varied the burning time, as desired. However, these compositions are corrosive and will interfere with firing mechanisms, thereby materially limiting the storage life of the smoke generating composition.

There have now been discovered novel smoke generating compositions which have improved storage stability properties, while also having the other desirable characteristics needed for producing controlled and effective amounts of smoke.

Accordingly, it is an object of this invention to provide improved pyrotechnic and smoke-generating compositions. Other objects will also become apparent to those skilled in the art upon reference to the following detailed descriptions and the example.

In accordance with this invention, there is provided a smoke-generating composition comprising the compound perchloropentacyclo-(5.2.1.0$^{2,6}$.0$^{3,9}$.0$^{5,8}$)-decane ($C_{10}Cl_{12}$), and zinc oxide. Additionally, zinc dust, aluminum dust, and other modifiers may be present to moderate heat evolution. In place of the perchloropentacyclo-(5.2.1.0$^{2,6}$.0$^{3,9}$.0$^{5,8}$)-decane other suitable halogen derivatives may be used, e.g., the bromine analog. Zinc oxide suitable for use in this invention should be of a fine particle size, and preferably should be low in lead content, and most preferably, free of lead. Very fine and very coarse zinc oxides form slower burning mixtures than the intermediate grades. The amounts or proportions of moisture, carbonates, and sulfates in the zinc oxide affect the burning rate, while the apparent density of the zinc oxide has no apparent effect on this rate. Commercial zinc oxides produced by either the French or American process are suitable for this application.

The proportion of aluminum used and its particle size can be varied within limits. The heat evolution of the smoke mixture increases with increasing aluminum content, while the burning time decreases. Generally 2 to 15 percent of the smoke mixture is aluminum, but preferably, from 3.6 to 10.1 percent. Finely divided aluminum causes a shorter burning time than the coarser aluminum powder. When the aluminum content is reduced below 5 percent, the burning becomes erratic, and retarders such as basic zinc oxide, urea and Monastral blue dye are added.

The preparation of perchloropentacyclo-(5.2.1.0$^{2,6}$.0$^{3,9}$.0$^{5,8}$)-decane ($C_{10}Cl_{12}$), a white crystalline solid, is disclosed in A. N. Johnson's United States Patent No. 2,996,553 and may be summarized as the condensing of hexachlorocylopentadiene in the presence of aluminum chloride, at an elevated temperature. Perchloropentacyclodecane contains approximately 71 percent chlorine and 29 percent carbon, and has a melting point of 485 degrees centigrade.

The prior art suggests the use of perchloropentacyclodecane as a fire-retardant additives in thermoplastic and thermoset resins which have application in the paper, paint, rubber, and electrical fields. Therefore, it is quite surprising to find perchloropentacyclodecane also to be well suited for inclusion in a composition for producing smoke and heat by burning.

The ratio of zinc oxide to perchloropentacyclodecane may be varied within wide limits, however, it is preferable that in all cases an amount less than the stoichiometric amount of perchloropentacyclodecane be employed. The reaction involved when the mix is ignited (as a "candle") may be shown as follows:

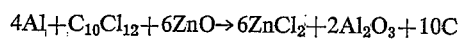

$$4Al + C_{10}Cl_{12} + 6ZnO \rightarrow 6ZnCl_2 + 2Al_2O_3 + 10C$$

The aluminum, zinc chloride, and carbon particles so formed all contribute to the obscuring power of the smoke. The ratio of zinc oxide to perchloropentacyclodecane may vary from 1.2 to 1.4 parts by weight to 7 to 1 parts by weight. Preferably the ratio employed will fall between 1 to 1 and 4 to 1. A composition of the following parts by weight produces a satisfactory screening smoke:

| | Parts |
|---|---|
| Perchloropentacyclodecane | 31.0 |
| Zinc oxide | 62.0 |
| Aluminum powder | 7.0 |

Temperatures in excess of 300 and preferably above 1000 degrees centigrade are necessary to initiate the reaction of the above mixture. However, once initiated, the reaction is self-sustaining. The initial heat may be supplied by any convenient means.

The particles of smoke vary in size from those just large enough to be perceived by the unaided eye to those that approach the size of the single molecules. In general, smoke particles are intermediate in size between dust particles ($10^{-4}$ centimeters) and gas particles ($10^{-7}$ centimeters) and average about $10^{-5}$ centimeters in diameter. As a rule, the smaller the particles in a given quantity of smoke, the greater is their obscuring power; hence, the aim is to generate a smoke consisting of the maximum number of particles of minimum size.

The invention is illustrated by but not limited to the following example. All proportions are by weight and temperatures are in degrees centigrade, unless otherwise indicated.

A smoke screen composition was prepared by mechanically blending together a composition composed of 31 percent perchloropentacyclodecane, 62 percent zinc oxide, and 7 percent powdered aluminum. The composition was consolidated at a 5,000 pound dead load into the grenade body and topped with an ignition compound. The burning time for this composition varied from 105 to 150 seconds, which is within the desired burning range for smoke screen grenades.

When viewed from a distance of 60 yards, after burning 2 minutes and 20 seconds in a 4 to 8 mile per hour wind, the smoke generated by a grenade completely obscured more distant objects in the observer's line of sight.

A determination of the particle size of the smoke evolved was made, according to standard sampling techniques employing a multi-stage impactor. Results are tabulated in the table below:

PARTICLE SIZE DISTRIBUTION

| Impactor Stage | Percent | Particle Size Microns (Average) |
|---|---|---|
| 1 | 10.3 | 10.9 |
| 2 | 17.2 | 4.5 |
| 3 | 13.3 | 2.3 |
| 4 | 26.0 | 1.4 |
| 5 | 13.1 | 0.74 |
| 6 | 20.1 | 0.41 |

Additional smoke grenades comprising housings containing the test composition were tested for storage stability. Specimen grenades were placed in hermetically sealed containers and stored at 160 degrees Fahrenheit for 90 days under high humidity conditions. At the end of this test period, all units functioned satisfactorily and exhibited little, if any, corrosion.

Various changes and modifications may be made in the method and apparatus of the invention, certain preferred forms of which have been herein described, without departing from the spirit and scope of the present invention.

What is claimed is:

1. A composition for producing smoke wherein the smoke-producing halide, perhalopentacyclo-decane, is present in less than stoichiometric amount with zinc oxide to produce smoke when said perhalopentacyclodecane and zinc oxide are ignited.

2. A process for producing an obscuring smoke which comprises reacting a zinc oxide with an amount less than the stoichiometric amount of perchloropentacyclo-$(5.2.1.0^{2,6}.0^{3,9}.0^{5,8})$-decane at an elevated temperature.

3. A smoke generating composition comprising zinc oxide, powdered aluminum, and perchloropentacyclo-$(5.2.1.0^{2,6}.0^{3,9}.0^{5,8})$-decane said zinc oxide being present in more than stoichiometric amounts with respect to the perchloropentacyclo-$(5.2.1.0^{2,6}.0^{3,9}.0^{5,8})$-decane and the powdered aluminum comprising from about 2 to about 15 percent of the total smoke-generating composition.

4. A smoke generating composition comprising zinc oxide and perchloropentacyclo-$(5.2.1.0^{2,6}.0^{3,9}.0^{5,8})$-decane in the ratio of from 1.2 to 1.4 parts by weight to 7 to 1 parts by weight, and powdered aluminum in an amount from 2 to 15 percent by weight of the combined zinc oxide and perchloropentacyclodecane.

5. A composition for producing smoke comprising perchloropentacyclo-$(5.2.1.0^{2,6}.0^{3,9}.0^{5,8})$-decane and zinc oxide wherein said zinc oxide is utilized in more than stoichiometric quantity.

References Cited

UNITED STATES PATENTS

| 1,632,339 | 6/1927 | Kiefer | 252—305 |
| 2,409,201 | 10/1946 | Finkelstein et al. | 252—305 |
| 2,494,454 | 1/1950 | Ritchie | 252—305 |
| 2,574,466 | 11/1951 | Clay | 252—305 |
| 2,695,258 | 11/1954 | Johnstone et al. | 252—305 |
| 2,996,553 | 8/1961 | Johnson | 260—648 |

LEON D. ROSDOL, *Primary Examiner.*

JULIUS GREENWALD, *Examiner.*

H. B. GUYNN, *Assistant Examiner.*